United States Patent [19]
Morley

[11] Patent Number: 6,131,281
[45] Date of Patent: Oct. 17, 2000

[54] METHOD FOR CREATING A MECHANICAL JOINT IN AN ENGINE OIL COOLER

[75] Inventor: Roy Morley, Peoria, Ill.

[73] Assignee: Caterpillar Inc., Peoria, Ill.

[21] Appl. No.: 09/256,610

[22] Filed: Feb. 23, 1999

[51] Int. Cl.$^7$ ................................................. B23P 15/26
[52] U.S. Cl. ..................... 29/890.03; 29/523; 29/888.011
[58] Field of Search ................................. 29/523, 890.03, 29/522.1, 521, 888.01, 888.011

[56] References Cited

U.S. PATENT DOCUMENTS

| | | | |
|---|---|---|---|
| 3,695,641 | 10/1972 | Engelking et al. | 285/121 |
| 3,967,840 | 7/1976 | McFall | 285/222 |
| 3,982,778 | 9/1976 | Spencer et al. | 285/222 |
| 4,749,047 | 6/1988 | Taylor | 166/382 |
| 4,872,253 | 10/1989 | Carstensen | 29/507 |
| 4,875,270 | 10/1989 | Krips et al. | 29/421.1 |
| 5,010,952 | 4/1991 | Chin et al. | 166/75.1 |
| 5,242,199 | 9/1993 | Hann et al. | 285/175 |
| 5,293,679 | 3/1994 | Hsu | 29/523 |
| 5,297,827 | 3/1994 | Choi | 285/351 |
| 5,430,929 | 7/1995 | Sanders | 29/507 |
| 5,509,699 | 4/1996 | Himmelberger | 285/337 |
| 5,667,252 | 9/1997 | Schafer et al. | 285/15 |

Primary Examiner—Irene Cuda
Attorney, Agent, or Firm—Maginot, Addison & Moore

[57] ABSTRACT

A method of manufacturing an end assembly of an engine oil cooler with an apparatus that includes (i) a compression member having a roller surface defined thereon, (ii) a motor operatively coupled to the compression member such that the motor can rotate the compression member around a central axis of rotation, and (iii) a drive cam for urging the compression member outwardly from the central axis of rotation, wherein the end assembly includes (i) an outer component which defines a first lumen and (ii) an inner component which defines a second lumen is described. The method includes the steps of (i) creating a channel in an interior surface of the outer component, (ii) positioning the inner component within the first lumen, (iii) locating the compression member within the first lumen and the second lumen such that (A) the compression member is completely contained within the first lumen and the second lumen and (B) the roller surface is in contact with the inner component and aligned with the channel, (iv) rotating the compression member around the central axis of rotation with the motor, and (v) moving the drive cam so as to cause the roller surface of the compression member to be urged against the inner component thereby causing a portion of the inner component to deform and move into the channel of the outer component thereby securing the inner component to the outer component.

8 Claims, 5 Drawing Sheets

METHOD FOR CREATING A MECHANICAL JOINT IN AN ENGINE OIL COOLER

TECHNICAL FIELD OF THE INVENTION

The present invention relates generally to an apparatus and method for creating a mechanical joint, and more particularly to an apparatus and method for creating a mechanical joint in an engine oil cooler.

BACKGROUND OF THE INVENTION

Work machines, such as crawler tractors, typically include an engine oil cooler. During the performance of a work function by the work machine the engine oil cooler functions to decrease the temperature of a volume of relatively hot engine oil. In particular, the hot oil is cooled as a result of simultaneously advancing a cooling fluid and the hot oil through the engine oil cooler such that the engine oil cooler can function as a heat exchanger.

The engine oil cooler includes a conduit (or inner component) having a lumen and a plurality of cooling tubes positioned within the lumen. The cooling tubes carry the aforementioned cooling fluid through the conduit during the cooling process and prevent the cooling fluid from mixing with the oil. The engine oil cooler also includes a pair of casting members (or outer components). Each end of the conduit has a casting member secured thereto. Each casting member provides (i) a cooling fluid entrance opening which is in fluid communication with the cooling tubes and (ii) a hot oil entrance opening which is in fluid communication with the lumen of the conduit.

Heretofore, the castings members have been secured to the ends of the conduit by a process that utilizes a silver braze alloy which contains cadmium. A draw back to this technique is that the cadmium is an environmental toxin and thus causes disposal problems during the manufacturing of the engine oil cooler. Moreover, the aforementioned process requires a kolene cleaning of the casting member prior to securing to the conduit, and this process also utilizes substances that cause disposal problems.

Furthermore, some engine oil cooler designs utilize polymeric O-rings to seal the joint between the conduit and the casting member. A drawback to this design is that the polymeric O-rings tend to degrade relatively quickly, and thus decrease the time the engine oil cooler can be utilized.

What is needed therefore is an apparatus and method for creating a mechanical joint in an engine oil cooler which overcomes one or more of the above-mentioned drawbacks.

DISCLOSURE OF THE INVENTION

In accordance with a first embodiment of the present invention, there is provided a method of manufacturing an end assembly of an engine oil cooler with an apparatus that includes (i) a compression member having a roller surface defined thereon, (ii) a motor operatively coupled to the compression member such that the motor can rotate the compression member around a central axis of rotation, and (iii) a drive cam for urging the compression member outwardly from the central axis of rotation, wherein the end assembly includes (i) an outer component which defines a first lumen and (ii) an inner component which defines a second lumen. The method includes the steps of (i) creating a channel in an interior surface of the outer component, (ii) positioning the inner component within the first lumen, (iii) locating the compression member within the first lumen and the second lumen such that (A) the compression member is completely contained within the first lumen and the second lumen and (B) the roller surface is in contact with the inner component and aligned with the channel, (iv) rotating the compression member around the central axis of rotation with the motor, and (v) moving the drive cam so as to cause the roller surface of the compression member to be urged against the inner component thereby causing a portion of the inner component to deform and move into the channel of the outer component thereby securing the inner component to the outer component.

In accordance with a second embodiment of the present invention, there is provided a method of creating a mechanical joint between (i) an outer component of an engine oil cooler and (ii) an inner component of the engine oil cooler with an apparatus that includes (i) a rotating head having an aperture and an interior chamber defined therein, (ii) a compression member positioned within the aperture, the compression member having a roller surface defined thereon, (iii) a motor operatively coupled to the rotating head such that the motor can rotate the rotating head around a central axis of rotation, and (iv) a drive cam positioned within the interior chamber of the rotating head. The method includes the steps of (i) creating a channel in an interior surface of the outer component, (ii) positioning the inner component within a first lumen defined by the outer component, (iii) locating the rotating head of the apparatus within the first lumen and a second lumen defined by the inner component such that (A) the compression member is completely contained within the first lumen and the second lumen and (B) the roller surface is in contact with the inner component and aligned with the channel, (iv) rotating the rotating head around the central axis of rotation with the motor, and (v) moving the drive cam so as to cause the roller surface of the compression member to be urged against the inner component thereby causing a portion of the inner component to deform and move into the channel of the outer component thereby securing the inner component to the outer component.

In accordance with a third embodiment of the present invention there is provided an apparatus for joining an outer component to an inner component, wherein (i) the outer component defines a first lumen, (ii) the first lumen has an interior surface which has a channel defined therein, (iii) the inner component defines a second lumen, and (iv) the inner component is positioned within the first lumen. The apparatus includes a rotating head having an aperture and an interior chamber defined therein. The apparatus also includes a compression member having a roller surface defined thereon for urging against the inner component, the compression member being positioned within the aperture. The apparatus further includes a drive cam positioned within the interior chamber of the rotating head, wherein (i) the rotating head is positioned within the first lumen and the second lumen such that the compression member completely contained within the first lumen and the second lumen and (ii) moving the drive cam causes the roller surface to be urged against the inner component.

BEST MODE FOR CARRYING OUT THE INVENTION

Figure 1:
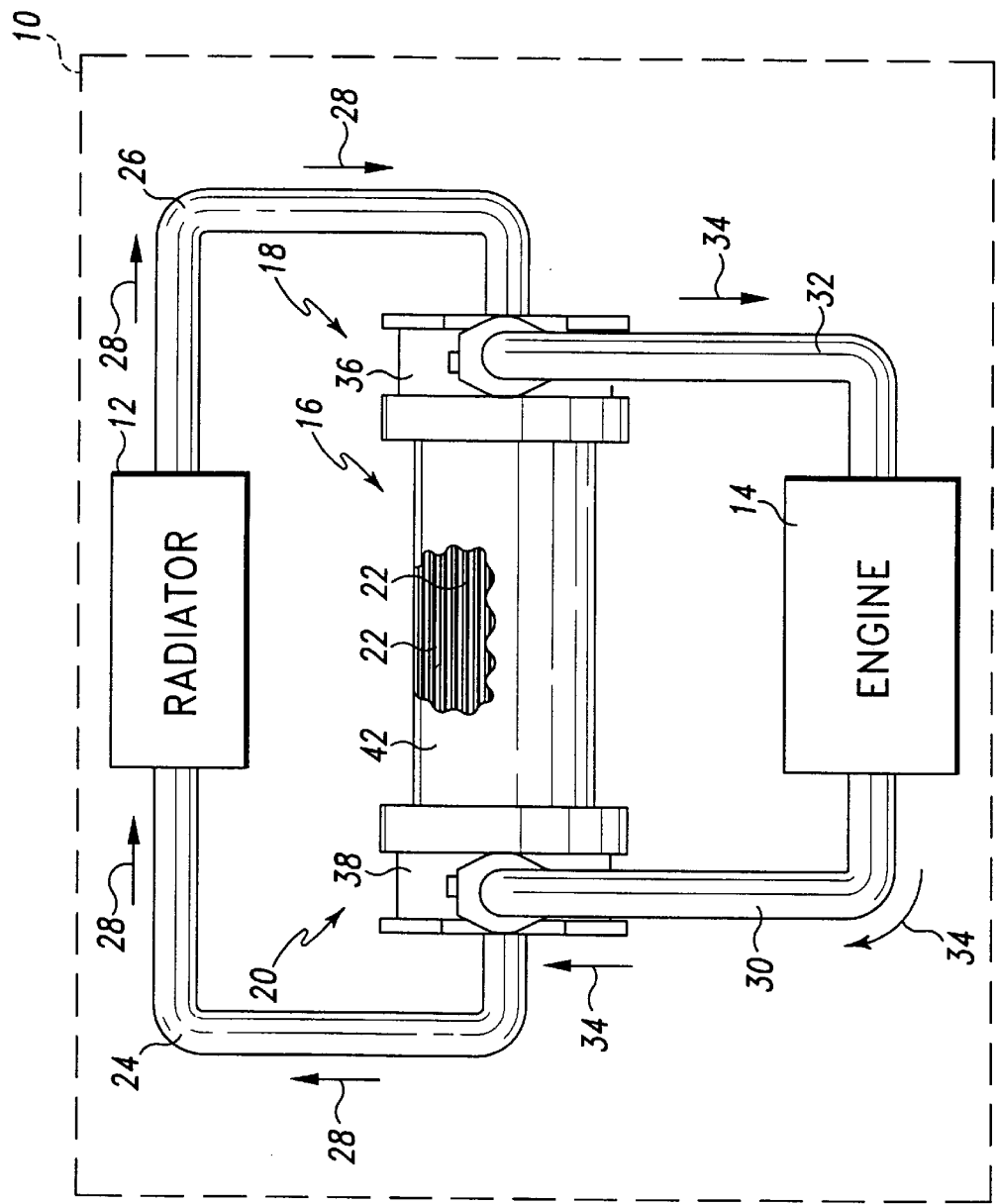
FIG. 1 is a schematic representation of a work machine that includes an engine oil cooler which incorporates the features of the present invention therein, note that the engine oil cooler is schematically shown coupled to an engine and a radiator of the work machine.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
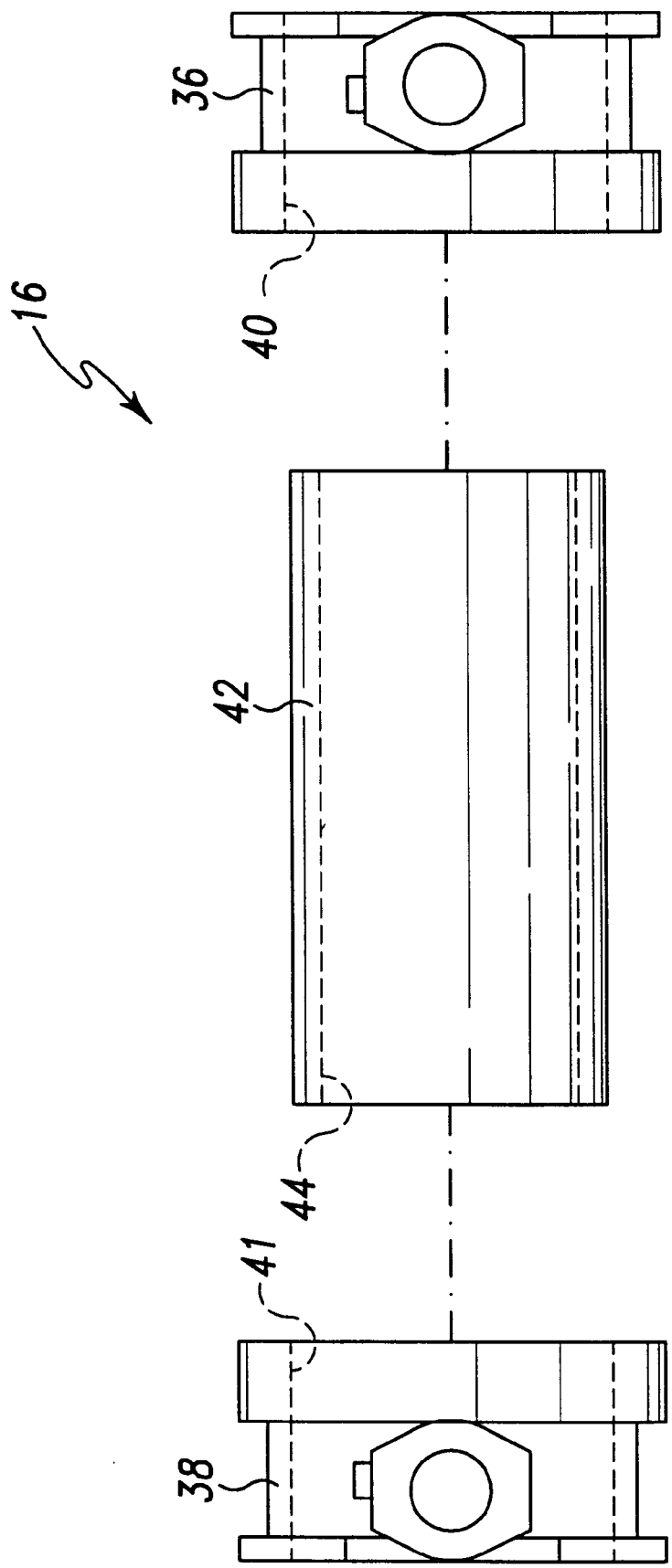
FIG. 2 is an exploded view of the engine oil cooler shown in FIG. 1.

Referring now to FIGS. 1 and 2, there is schematically shown a work machine 10 which includes an engine oil cooler 16 that incorporates the features of the present invention therein. The work machine 10 also includes a radiator 12, an engine 14, and hoses 24, 26, 30, and 32.

Engine oil cooler 16 includes (i) an outer component 36 which defines a lumen 40, (ii) an outer component 38 which defines a lumen 41, and (iii) an inner component 42 which defines a lumen 44. Outer components 36 and 38 are preferably made from gray iron, while inner component 42 is preferably made from steel. Engine oil cooler 16 also includes a plurality of cooling tubes 22 disposed within lumen 44. As will be discussed in greater detail below, outer component 36 is secured to an end of inner component 42 with a mechanical joint 96 (see FIG. 4) so as to form end assembly 18. In an identical manner, outer component 38 is secured to the opposite end of inner component 42 with a mechanical joint (not shown) to form end assembly 20.

Figure 3:
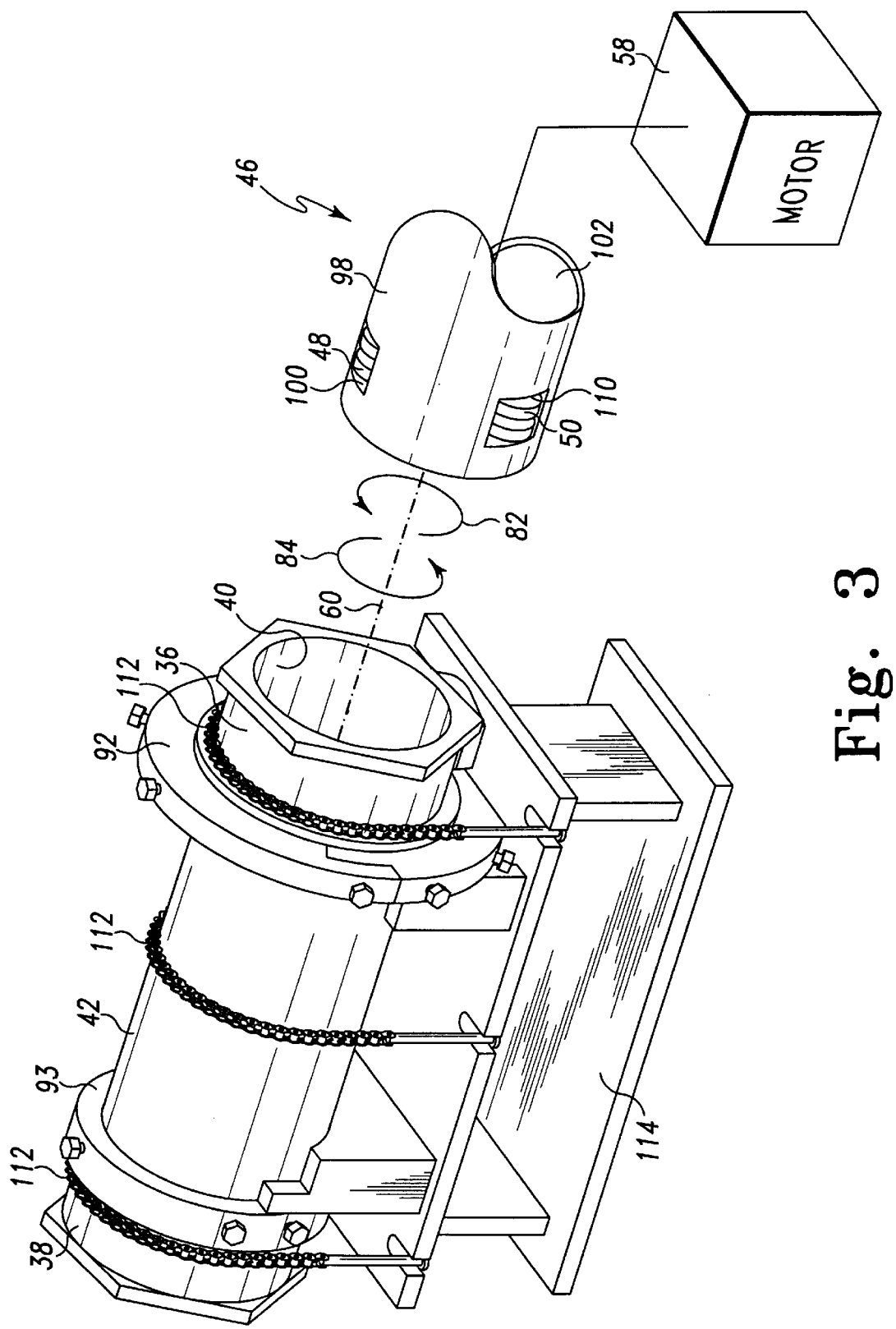
FIG. 3 is a perspective view of the engine oil cooler of FIG. 1 and a fragmentary view of an apparatus for creating a mechanical joint in the engine oil cooler which incorporates the features of the present invention therein (note that a portion of the apparatus is shown schematically)
Figure 4:
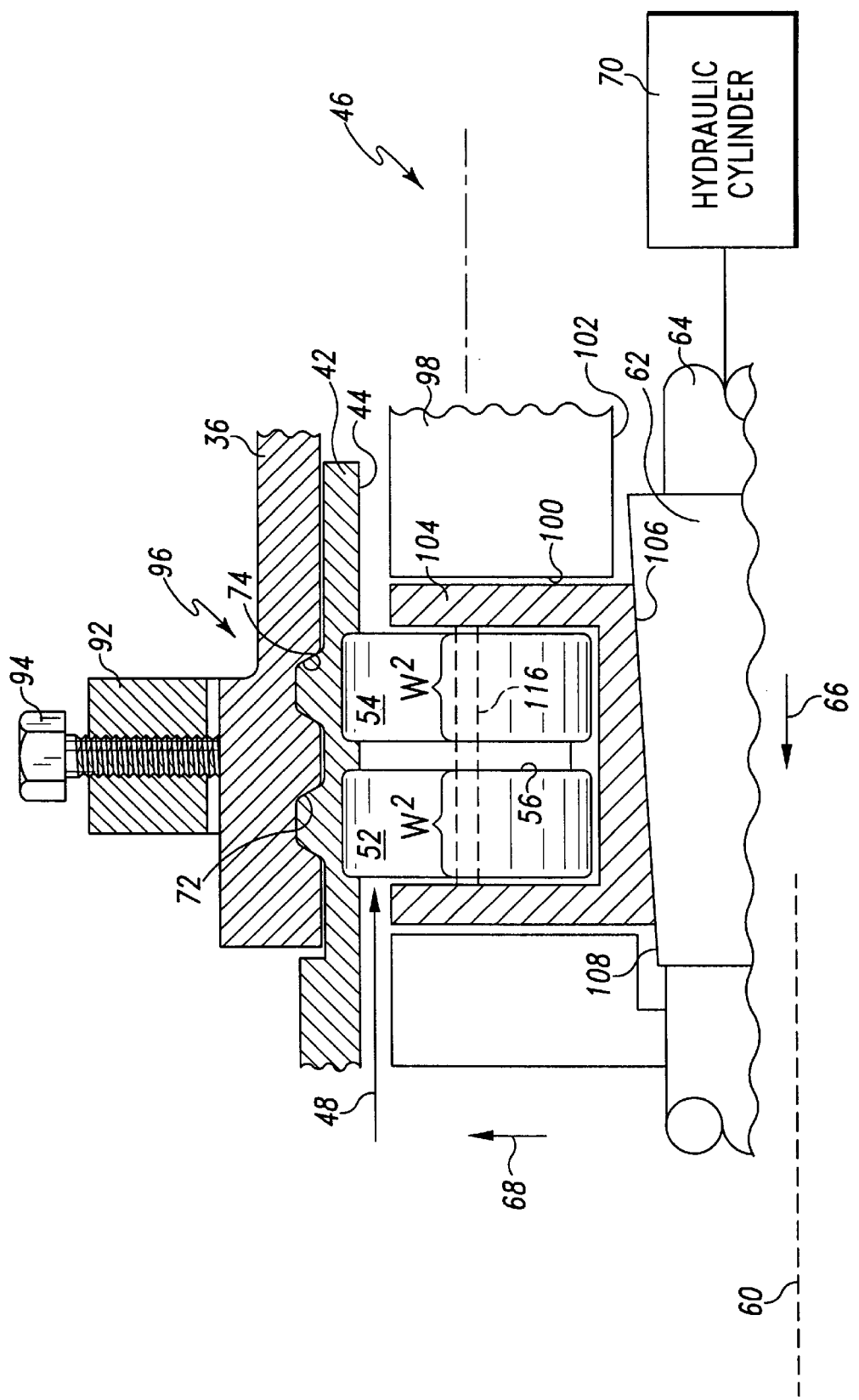
FIG. 4 is a fragmentary, cross sectional view of the engine oil cooler of FIG. 1 and the apparatus of FIG. 3 taken through the rotating head of the apparatus after the rotating head has been positioned within the engine oil cooler.

As previously mentioned, outer component 36 is secured to an end of inner component 42 with mechanical joint 96 so as to form end assembly 18. In particular, mechanical joint 96 is created utilizing an apparatus 46 as shown in FIGS. 3 and 4. Apparatus 46 includes a rotating head 98 and compression members 48 and 50. Apparatus 46 also includes a third compression member which is not shown in the figures. However, the third compression member is identical to compression members 48 and 50. The apparatus further includes a drive cam 62, a shaft 64, and a hydraulic cylinder 70. The apparatus 46 also includes a motor 58, constraining members 92 and 93, support members 104, restraining straps 112, and a base 114.

Rotating head 98 has apertures 100 and 110 defined therein. It should be understood that rotating head 98 also has a third aperture defined therein which is not shown in any of the figures. However, the third aperture is identical to apertures 100 and 110. Apertures 100, 110, and the third aperture are preferably spaced apart from each other at 120° intervals around the outer circumference of rotating head 98. The rotating head 98 also has an interior chamber 102 defined therein. Each of the apertures 100, 110 and the third aperture lead into the interior chamber 102.

Referring now to FIG. 4, each support member 104 has an inclined surface 106 defined thereon. One support member 104 is positioned within each aperture 100, 110, and the third aperture.

Compression member 48 is positioned within a support member 104 and the aperture 100. In particular, compression member 48 is rotatably mounted on an axle 116 which is secured to support member 104. The compression member 48 has a pair roller surfaces 52 and 54 defined thereon which are separated by a space 56. Each roller surface has a width $W^2$.

It should be understood that compression member 50 is positioned within (i) a support member 104 and (ii) the aperture 110 (see FIG. 3) in an identical manner as described above for compression member 48 and thus will not be further discussed herein. Moreover, the third compression member is also positioned within a support member 104 in an identical manner as discussed above for compression member 48. Furthermore, the third compression member and the support member 104 it is located in are positioned within the third aperture in an identical manner as described above for compression member 48. It should be appreciated that the third compression member and compression member 50 also have a pair of roller surfaces defined thereon which are separated by a space 56. Each roller surface defined on the third compression member and compression member 50 has a width $W^2$. Hereinafter it will be appreciated that any description relating to compression member 48 also applies to compression member 50 and the third compression member.

As shown in FIG. 3, motor 58 is operatively coupled to the rotating head 98 such that the motor 58 can rotate the rotating head 98 and compression member 48 around a central axis of rotation 60. In particular, motor 58 can rotate the rotating head 98 in a clock wise direction and in a counter clock wise direction as indicated by arrows 84 and 82 respectively.

As shown in FIG. 4, the drive cam 62 has a inclined surface 108 defined thereon. The drive cam 62 is attached to shaft 64. Drive cam 62 and shaft 64 are both positioned within the interior chamber 102 of the rotating head 98 such that inclined surface 108 is in contact with the inclined surface 106 of each support member 104. In addition, shaft 64 is operatively coupled to hydraulic cylinder 70.

Constraining members 92 and 93, restraining straps 112, and base 114 are all secured to base 114 as shown in FIG. 3.

Figure 5:
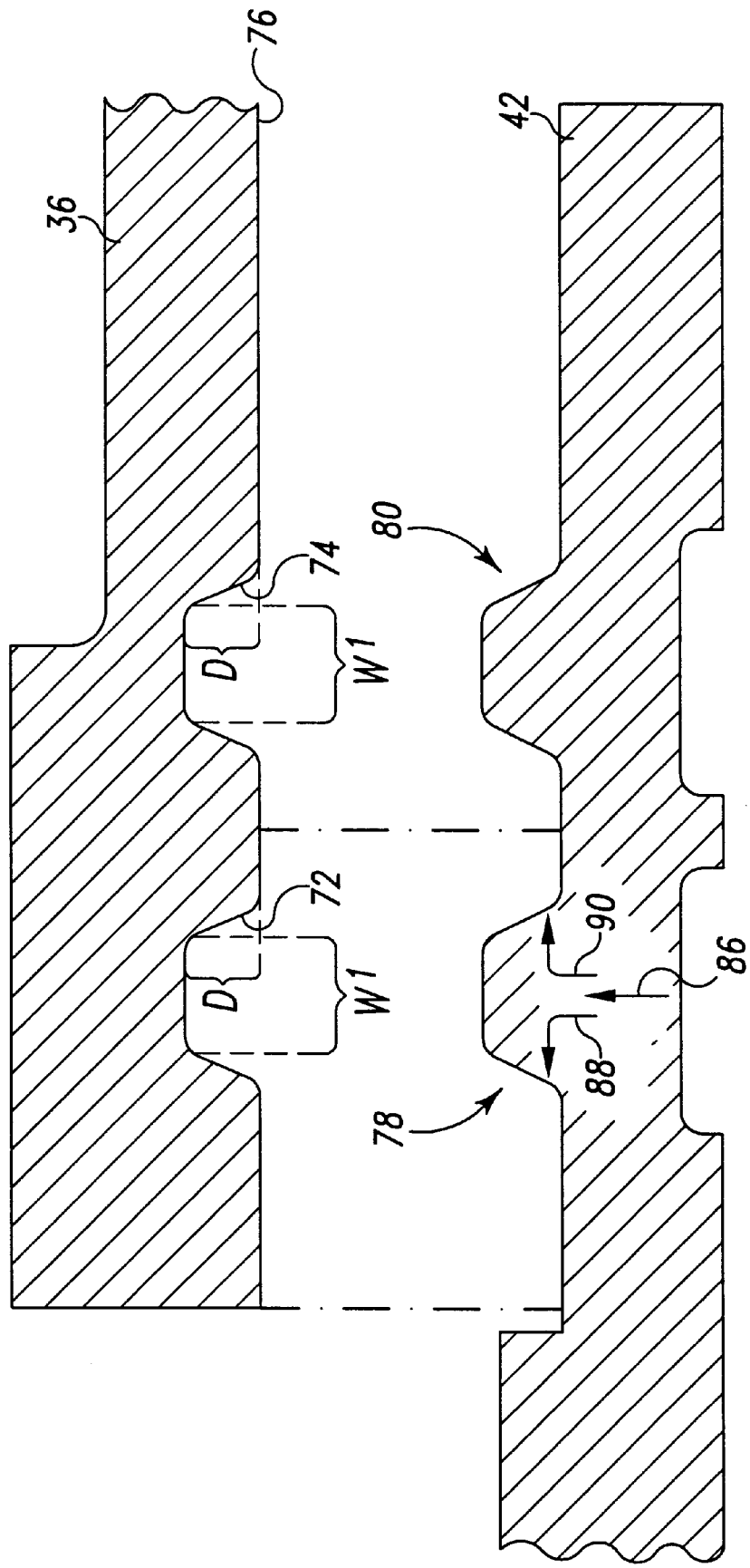
FIG. 5 is an enlarged, cross sectional, fragmentary view of a portion of the outer component and the inner component of the engine oil cooler of FIG. 1.

In order to secure the inner component 42 to the outer component 36, thereby creating end assembly 18 of engine oil cooler 16, a pair of channels 72 and 74 are created in an interior surface 76 of outer component 36 as shown in FIG. 5. In particular, channel 72 can be machined in the interior surface 76 of outer component 36 such that channel 72 has a depth D and a width $W^1$. Preferably, channel 72 has (i) a depth D of about 1.0 to about 2.0 millimeters and (ii) a width $W^1$ of about 5.0 to about 6.0 millimeters. More preferably, channel 72 has a width $W^1$ and a depth D such that $W^1 \div D = Y$, and $2.5 \leq Y \leq 4.5$. It should be understood that channel 74 is created in the same manner as channel 72 and has substantially the dimensions as channel 72, in particular the same width $W^1$ and depth D of channel 72.

Referring now to FIGS. 3 and 4, once channels 72 and 74 are created as described above, inner component 42 is positioned within lumen 40 of outer component 36 such that inner component 42 and outer component 36 are in a coaxial relationship with one another. Inner component 42 and outer component 36 are then positioned relative to base 114 such that constraining member 92 is (i) disposed around outer component 36 and inner component 42 and (ii) the constraining member 92 is positioned over channels 72 and 74 as shown in FIG. 4. A number of fasteners 94 are then screwed through constraining member 92 such that each fastener 94 is biased against outer component 36. (Note that other fasteners besides screws can be used, e.g. small hydraulic cylinders can be utilized.) A restraining strap 112 is then disposed around outer component 36 and attached to base 114. It should be understood that constraining member 92 and restraining strap 112 secure inner component 42 and outer component 36 to base 114 as shown in FIG. 3.

After securing inner component 42 and outer component 36 to base 114 as described above, the rotating head 98 of apparatus 46 is positioned within lumen 40 and lumen 44 such that (i) the compression member 48 is completely contained within lumen 40 and lumen 44 and (ii) roller surfaces 52 and 54 are in contact with inner component 42 and aligned with channels 72 and 74, respectively, as shown in FIG. 4. What is meant herein by "aligned" is that, as shown in FIG. 4, the roller surface 52 is positioned relative to the channel 72 such that a vertical line that extends through channel 72 will also extend through roller surface 52. The same meaning of "aligned" also applies to roller surface 54 and channel 74.

It should be understood that, preferably, the width $W^1$ of channel 72 and the width $W^2$ of the roller surface 52 have the following relationship, $W^1 \div W^2 = X$, and $0.50 \leq X \leq 0.75$.

Once rotating head 98 is located within lumen 40 and lumen 44 such that (i) the compression member 48 is completely contained within lumen 40 and lumen 44 and (ii) roller surfaces 52 and 54 are in contact with inner component 42 and aligned with channels 72 and 74, as shown in FIG. 4, the motor 58 is actuated so as to rotate the rotating head 98 (and therefore the compression member 48) around the central axis of rotation 60. In particular, the rotating head 98 is rotated around the central axis of rotation 60 in a clockwise direction for a first period of time and then rotated around the central axis of rotation 60 in a counter clockwise direction for a second period of time. Preferably, the first period of time and the second period of time each last about 2 minutes. In addition, it should be understood that the rotating head 98 is typically rotated around the central axis of rotation 60 at a rate of about 20 to 25 inches/minute. Preferably, the rotation rate is about 21.99 inches/minute.

During the above described rotation of rotating head 98, the drive cam 62 is continuously moved or urged by hydraulic cylinder 70 in the direction as indicated by arrow 66 (see FIG. 4). Moving drive cam 62 in the above described manner results in support member 104, and thus roller surfaces 52 and 54 of compression member 48, being urged against the inner component 42 in the direction indicated by arrow 68 (see FIG. 4). For example, compression member 48 is urged in the direction of arrow 68 with about 85,000 to 95,000 pounds of force. In particular, compression member 48 is urged in the direction of arrow 68 with about 90,560 pounds of force. It should be understood that the above described force results in compression member 48, and thus roller surfaces 52 and 54, moving in the direction of arrow 68 at a rate of about 0.0005 to 0.001 inches/revolution of rotating head 98. Urging roller surfaces 52 and 54 as described above causes portions 78 and 80 (see FIG. 5) of the inner component 42 to deform and move into the channels 72 and 74 (see FIG. 4) of the outer component 36. It should be appreciated that the above described parameters, i.e. the rotation rate of rotating head 98, the amount of force applied to compression member 48, and the movement of compression member 48 in the direction of arrow 68, can be influence by the physical characteristics of the mechanical joint being formed, e.g. the hardness of inner component 42, the width $W^1$ and depth D of channels 72 and 74, and the width $W^2$ of roller surfaces 52 and 54. However, the appropriate changes to the aforementioned parameters (i.e. rotation rate, force, and movement) can be determined with routine experimentation.

It should be appreciated that the section of inner component 42 positioned directly adjacent to the channels 72 and 74 is initially substantially flat, and that urging the roller surfaces 52 and 54 against the inner component 42 in the above described manner causes the portions 78 and 80 to extend outwardly toward outer component 36 and thus enter channels 72 and 74. In particular, as shown in FIG. 5, urging the roller surfaces 52 and 54 against the inner component 42 in the above described manner causes the portions 78 and 80 of inner component 42 to move (i) outwardly in a direction indicated by arrow 86 and (ii) axially in the directions indicated by arrows 88 and 90. Moving portions 78 and 80 of inner component 42 into channels 72 and 74 of outer component 36 as described above results in the creation of the mechanical joint 96 which secures inner component 42 to outer component 36 thereby creating end assembly 18 of engine oil cooler 16. Once end assembly 18 is created, rotating head 98 of apparatus 46 is removed from lumens 44 and 40.

End assembly 20 of engine oil cooler 16 is created in an identical manner as discussed above for end assembly 18. In other words, outer component 38 is secured to inner component 42 in a substantially identical manner as described above for outer component 36 and inner component 42. Once end assembly 20 is created, engine oil cooler 16 can be removed from base 114 and subjected to other manufacturing steps, e.g. the addition of the cooling tubes 22.

It should be appreciated that one advantage of the present invention is the fact that compression member 48 is small enough (i.e. compression member 48 has a relatively narrow width) such that compression member 48 is completely contained within lumen 40 and lumen 44 during the time it is urged against inner component 42. Because compression member 48 is relatively small, the contact surface area between compression member 48 and inner component 42 is also relatively low as compared to other devices. Therefore, since the contact surface area between compression member 48 and inner component 42 is low, the amount of mechanical stress communicated to outer component 36 during the time compression member 48 is urged against inner component 42 is also relatively low. As a result, the probability that outer component 36 will crack during the time compression member 48 is urged against inner component 42 is decreased. This is in contrast to other arrangements for creating a mechanical joint where the apparatus includes a compression member that has a relatively large width such that the compression member extends outside of the lumen of the outer component during the time the compression member is urged against the inner component. Having such a large compression member increases the contact surface area between the compression member and the inner component of the mechanical joint, which in turn increases the mechanical stress communicated to the outer component of the mechanical joint. Increasing the mechanical stress communicated to the outer component of the mechanical joint, increases the probability of the outer component cracking during the time the compression member is urged against the inner component.

As stated above having compression member 48 located in the above described manner (i.e. located within both lumens 40 and 44) is an advantage since it reduces the amount of mechanical stress communicated to outer component 36 while the roller surfaces 52 and 54 are urged against the inner component 42. Reducing the amount of mechanical stress communicated to outer component 36 is important since the outer component is preferably made from materials, such as gray iron, which are susceptible to cracking when subjected to a significant amount of mechanical stress. Therefore, using an apparatus which includes a compression member that extends outside of the lumen 40 of an outer component 36 made of gray iron during the time the compression member is urged against the inner component 42 would result in the cracking of outer component 36 which is highly undesirable. On the other hand, utilizing the present invention which has the compression member 48 completely contained within lumen 40 and lumen 44 allows the mechanical joint 96 to be formed between an outer component 36 made of gray iron and the inner component 42 without creating any cracks in the outer component 36.

INDUSTRIAL APPLICABILITY

As shown in FIG. 1, during use, the engine oil cooler 16 is placed in fluid communication with the radiator 12 of work machine 10 via the hoses 24 and 26. In particular, the engine oil cooler 16 is placed in fluid communication with radiator 12 such that a cooling fluid is continuously circulated through a fluid path defined by the cooling tubes 22 of engine oil cooler 16, the hose 24, the radiator 12, and the hose 26 in the directions indicated by arrows 28. The cooling fluid is continuously circulated in the above described manner by a pump (not shown) associated with radiator 12.

The engine oil cooler 16 is also placed in fluid communication with the engine 14 of work machine 10 via hoses 30 and 32. In particular, engine oil cooler 16 is placed in fluid communication with the engine 14 such that the engine oil is continuously circulated through a fluid path defined by the engine oil cooler 16, the hose 32, the engine 14, and the hose 30 in the directions indicated by arrows 34. The cooling fluid is continuously circulated in the above described manner by a pump (not shown) associated with engine 14. It should be appreciated that the cooling fluid and the engine oil are prevented from being mixed during advancement through the engine oil cooler 16, since the cooling fluid is advanced through the engine oil cooler 16 via the cooling tubes 22 which keep the cooling fluid separated from the engine oil.

As the engine oil and the cooling fluid are simultaneously circulated through the engine oil cooler 16 in the above described manner, heat from the hot engine oil is transferred to the cooling fluid, thereby cooling the engine oil. As the cooling fluid is circulated through the radiator, heat transferred to the cooling fluid from the engine oil is transferred to the surrounding environment, thereby reducing the temperature of the cooling fluid. After being advanced through the radiator 12 in the above described manner, the cooling fluid is recirculated through the engine oil cooler 16 so as to cool an additional volume of engine oil. The above described circulation and heat exchange arrangement maintains the temperature of the engine oil within predetermined acceptable limits.

It should be understood that the engine oil is advanced through the engine oil cooler 16 at a relatively high pressure. However, the mechanical joints (i.e. the mechanical joint 96 and the mechanical joint between outer component 38 and inner component 42) created utilizing the previously discussed apparatus 46 and method do not allow any oil to pass through the mechanical joint and leak out of engine oil cooler 16.

It should further be understood that the mechanical joints formed by the present invention do not require the use of any silver braze alloy or the use of a kolene cleaning process. Therefore, the present invention avoids the previously discussed environmental problems associated with utilizing this substance or the kolene cleaning process. Moreover, the present invention does not require that a polymeric O-ring be used to seal the mechanical joint between the inner component 42 and the outer components 36 and 38. Thus, the previously discussed degradation problems experienced with utilizing polymeric O-rings in an engine oil cooler are avoided.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the present invention is described above as being used to manufacture an engine oil cooler, the present invention can also be used to manufacture other types of devices which require the creation of a mechanical joint such as transmission oil coolers or low pressure hydraulic cylinders.

What is claimed is:

1. A method of manufacturing an end assembly of an engine oil cooler with an apparatus that includes (i) a compression member having a roller surface defined thereon, (ii) a motor operatively coupled to said compression member such that said motor can rotate said compression member around a central axis of rotation, and (iii) a drive cam for urging said compression member outwardly from said central axis of rotation, wherein said end assembly includes (i) an outer component which defines a first lumen and (ii) an inner component which defines a second lumen, comprising the steps of:

creating a channel in an interior surface of said outer component;

positioning said inner component within said first lumen;

locating said compression member within said first lumen and said second lumen such that (i) said compression member is completely contained within said first lumen and said second lumen and (ii) said roller surface is in contact with said inner component and aligned with said channel;

rotating said compression member around said central axis of rotation with said motor; and moving said drive cam so as to cause said roller surface of said compression member to be urged against said inner component thereby causing a portion of said inner component to deform and move into said channel of said outer component thereby securing said inner component to said outer component.

2. The method of claim 1, wherein:

said compression member is operatively coupled to said motor such that said motor can rotate said compression member around said central axis of rotation in a clockwise direction and in a counter clockwise direction, and said rotating step includes the steps of (i) rotating said compression member around said central axis of rotation in said clockwise direction for a first period of time and (ii) rotating said compression member around said central axis of rotation in said counter clockwise direction for a second period of time.

3. The method of claim 1, wherein:

said actuating step includes the step of moving said portion of said inner component in an axial direction relative to said inner component.

4. The method of claim 1, wherein:

said channel created in said interior surface of said outer component has a width $W^1$, said roller surface has a width $W^2$, $W^1 \div W^2 = X$, and $0.50 \leq X \leq 0.75$.

5. The method of claim 1, wherein:

said channel created in said interior surface of said outer component has a width $W^1$ and a depth D, $W^1 \div D = Y$, and $2.5 \leq Y \leq 4.5$.

6. The method of claim 1, wherein:

said apparatus further includes a constraining member disposed around said outer component and said inner component such that said constraining member is positioned over said channel defined in said interior surface of said outer component.

7. The method of claim 1, wherein:

said outer component is made from a material which includes gray iron.

8. The method of claim 1, wherein:

said apparatus further includes a support member which supports said compression member, and said moving step includes the step of urging said drive cam against said support member so as to cause said roller surface of said compression member to be urged against said inner component thereby causing a portion of said inner component to deform and move into said channel of said outer component thereby securing said inner component to said outer component.

* * * * *